Sept. 13, 1949.  A. W. FOERSTER  2,481,736
ILLUMINATED LEVEL
Filed Feb. 11, 1946
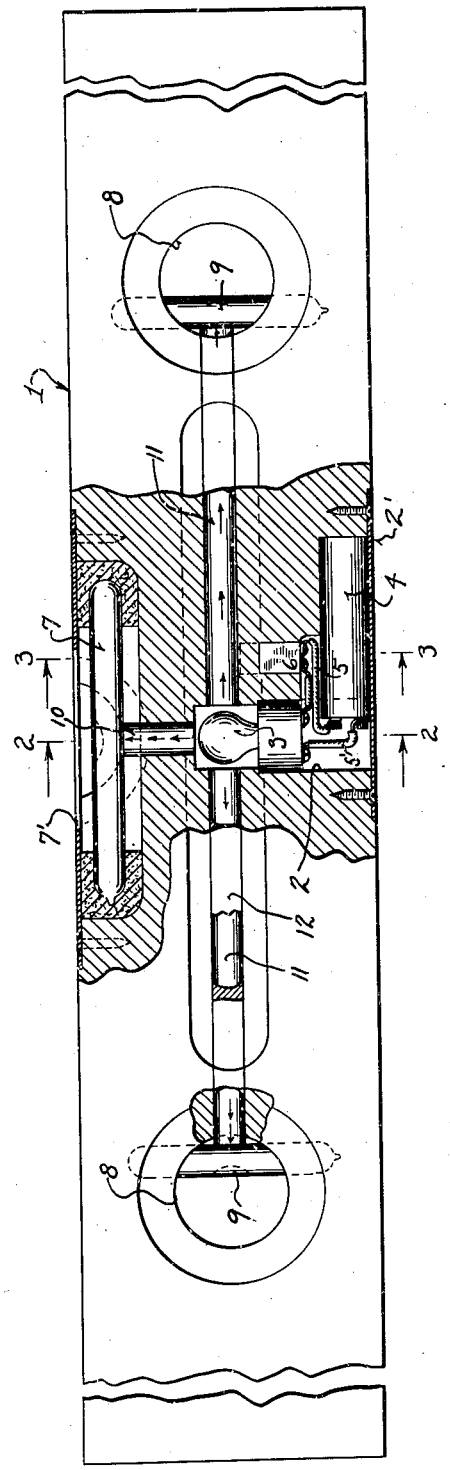
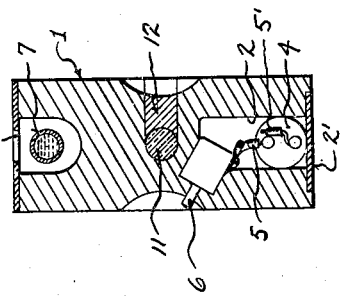
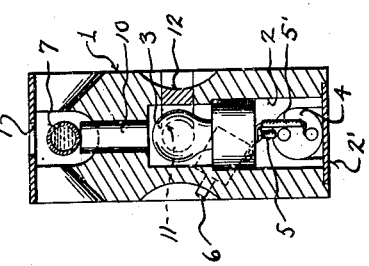
INVENTOR
ALBERT W. FOERSTER
BY
ATTORNEYS Patented Sept. 13, 1949

2,481,736

UNITED STATES PATENT OFFICE 2,481,736

ILLUMINATED LEVEL

Albert W. Foerster, Milwaukee, Wis., assignor of one-half to Gerald D. Carter, Milwaukee, Wis.

Application February 11, 1946, Serial No. 646,828

1 Claim. (Cl. 240—6.44)

My invention refers to spirit levels having one or more exposed sight tubes therein.

The primary object of the invention is to provide a single battery controlled light bulb imbedded in the level having transparent plastic rod sections extending from the light bulb to the sight tubes whereby the level may be conveniently illuminated when the operator is working in dark corners, or the like. The specific object of my invention is to provide a single push button controlled electric light bulb, having a plurality of plastic rod sections leading from the bulb to the series of sight tubes, whereby great economy and cheapness of construction is accomplished.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the drawings:

Figure 1 represents a side elevation of a spirit level, embodying the features of my invention, with parts broken away and other parts in section, to more clearly illustrate structural features.

Figure 2 is a cross-section of the same, the section being indicated by line 2—2 of Figure 1, and Figure 3, another cross-section upon a plane, indicated by the line 3—3 of Figure 1.

Referring by characters to the drawing, 1 represents the block of a spirit level having a central recess 2 therein for the reception of an electric light bulb 3 and a battery 4. The battery is connected to the light bulb by wire connections 5, 5'.

The wire connection 5 is interrupted by a switch or push button 6, which push button extends beyond the block for convenience in controlling the electric light bulb.

The elongated block, it will be noted, is provided with a single centrally disposed L-shaped recess, whereby the removable parts embodying a light bulb and battery, are snugly fitted therein and closed by a metallic plate 2'. Thus, the construction is materially simplified, and when repairs are necessary it only involves removing the light unit from the L-shaped recess.

In this exemplification of my invention, the level block has mounted therein a horizontally positioned spirit level tube 7 under a peep opening 7'.

The block 1 is also provided with circular peep openings 8—8 for the reception of vertically disposed spirit level tubes 9—9.

Mounted within the block is a vertically disposed transparent plastic rod section 10, the blunt ends of which are positioned in juxtaposition to the light bulb and sight tube 7.

The block 1 has also mounted therein a pair of horizontally positioned plastic rod sections 11—11, the ends of which rod sections are in axial alignment with the single light bulb and the opposite ends thereof are in alignment with the sight tubes 9—9.

For convenience in assemblage, the block is channeled out for the introduction of the plastic rod sections 11 and thereafter the channel is plugged by a strip 12.

It will be noted also that in order to replace the battery 4, the mouth of the recess 2 is closed with a metallic plate 2', the same being secured by screws.

From the foregoing, the block recess may be readily opened and closed for repairs or renewal of the light bulb and associated parts.

While I have illustrated the level as being provided with three sight tubes, obviously the sight tubes may be varied as to number, bearing in mind that the important feature of the invention is the arrangement of plastic rod sections radiating from the single light bulb, to the series of sight tubes, whereby one light bulb will serve the purpose to direct light rays to all sight tubes through the transparent plastic rod sections.

The transparent plastic rod sections which direct the light rays may be composed of any transparent material through which light is longitudinally developed from end to end.

While I have specifically described transparent plastic rods for directing the rays of light, in some instances I may utilize tubular rods through which the light is directed.

I claim:

In a spirit level comprising an elongated block having central and end openings therein, carrying spirit level tubes, the block being formed with a central L-shaped recess therein, a longitudinally disposed channel extending through one face of the block in communication with the central recess and end openings therein, a light bulb fitted in the vertical stem of the L-shaped recess, a battery electrically connected to the bulb fitted into the foot of the L-shaped recess, whereby the light unit is compactly nested, a switch button for the battery connections extending through the block, transparent rod sections imbedded in the block channel, each pointing an end toward the light bulb, and the opposite end of the same being pointed toward a spirit level, and a one-piece filler strip fitted into the channel to confine the longitudinally disposed transparent rods.

ALBERT W. FOERSTER.

REFERENCES CITED

The following references are of record in the file of this patent:

UNITED STATES PATENTS

| Number | Name | Date |
|---|---|---|
| 1,098,039 | Kibler et al. | May 26, 1914 |
| 1,110,456 | O'Brien | Sept. 15, 1914 |
| 2,367,858 | Flynn | Jan. 23, 1945 |